(No Model.)
E. N. HIGLEY.
ILLUMINATED TILE.
No. 312,269. Patented Feb. 17, 1885.
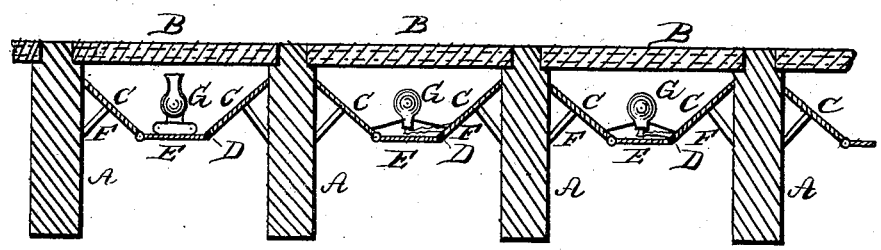
Witnesses
Wm Lecher
John C Ryan
Inventor
Eben N. Higley
by
Joseph T. Power
his Attorney.

UNITED STATES PATENT OFFICE.

EBEN N. HIGLEY, OF GREAT FALLS, NEW HAMPSHIRE.

ILLUMINATED TILE.

SPECIFICATION forming part of Letters Patent No. 312,269, dated February 17, 1885.

Application filed October 9, 1884. (No model.)

*To all whom it may concern:*

Be it known that I, EBEN N. HIGLEY, a citizen of the United States, residing at Great Falls, in the county of Strafford and State of New Hampshire, have invented certain new and useful Improvements in Illuminated Tiles; and I do declare the following to be a full, clear, and exact description of the invention, such as will enable others skilled in the art to which it appertains to make and use the same, reference being had to the accompanying drawing, and to the letters and figures of reference marked thereon, which form a part of this specification, and which drawing represents a vertical sectional view of a portion of a floor provided with my improvements, showing different means of illumination.

My invention has relation to flooring constructed with tiles of glass or similar transparent or translucent material; and it consists in the improved construction and combination of parts of such a flooring illuminated from underneath, as hereinafter more fully described and claimed.

In the accompanying drawing, the letter A indicates the girders or flooring-timbers, upon the upper edges of which the edges of the tiles B rest, which tiles are of glass or similar transparent or translucent material. Inclined mirrors or reflectors C are secured at their upper edges to the upper portions of the girders and at their lower edges to frames D, having hinged doors E opening downward, and inclined braces F serve to furthermore support the reflectors, and lamps G, which may be of any desired construction, using any known means for producing light, are supported by the frames D, the hinged doors giving access to them. In this manner an illuminated flooring or pavement is constructed, which may be useful as well as ornamental, and, although being in no wise different from any common glass floor or pavement by day, being useful as an illuminator by night.

I am aware that glass slabs or tiles have been used for floors, vault-covering, and pavements; and I am also aware that natural or artificial light has been thrown from above through such flooring or pavement; but I am not aware that artificial light has been reflected from below through slabs or tiles of glass in a floor or pavement; and I therefore claim—

1. In a floor or pavement, the combination of slabs or tiles of glass or similar translucent or transparent material with means, substantially as shown, for illuminating the said tiles from below by reflected artificial light, as and for the purpose shown and set forth.

2. The combination, in a floor or pavement, of slabs or tiles of glass or similar transparent or translucent material, inclined reflectors arranged below said slabs or tiles, and lamps supported below the slabs or tiles, throwing their light into the reflectors, as and for the purpose shown and set forth.

3. The combination of the girders or flooring-timbers, the slabs or tiles of glass or similar transparent or translucent material, supported at their edges upon the upper edges of the girders, inclined reflectors secured at their upper edges under the edges of the slabs or tiles, and at their lower edges to frames having downwardly-opening hinged doors, inclined braces supporting the reflectors, and lamps or similar producers of artificial light secured in the frames, as and for the purpose shown and set forth.

In testimony whereof I affix my signature in presence of two witnesses.

EBEN N. HIGLEY.

Witnesses:
JOSEPH A. STICKNEY,
MICHAEL JOHNSON.